US012420287B2

(12) United States Patent
Bei Der Sandwisch et al.

(10) Patent No.: US 12,420,287 B2
(45) Date of Patent: Sep. 23, 2025

(54) EDDY CURRENT BRAKE FOR A CRUSHER

(71) Applicant: Metso USA Inc., Brookfield, WI (US)

(72) Inventors: Leon Paul Heinrich Bei Der Sandwisch, Neuenkirchen (DE); Guido Leuschen, Bielefeld (DE)

(73) Assignee: Metso USA Inc., Brookfield, WI (US)

( * ) Notice: Subject to any disclaimer, the term of this patent is extended or adjusted under 35 U.S.C. 154(b) by 345 days.

(21) Appl. No.: 18/169,930

(22) Filed: Feb. 16, 2023

(65) Prior Publication Data
US 2024/0278252 A1   Aug. 22, 2024

(51) Int. Cl.
| | | |
|---|---|---|
| *B02C 4/42* | (2006.01) |
| *B02C 1/02* | (2006.01) |
| *B02C 1/04* | (2006.01) |
| *B02C 1/08* | (2006.01) |
| *B02C 2/00* | (2006.01) |
| *B02C 4/10* | (2006.01) |
| *H02K 49/00* | (2006.01) |
| *H02K 49/04* | (2006.01) |
| *H02K 49/10* | (2006.01) |

(52) U.S. Cl.
CPC ............... *B02C 4/42* (2013.01); *B02C 4/10* (2013.01); *H02K 49/043* (2013.01)

(58) Field of Classification Search
CPC .... B02C 4/42; B02C 4/10; B02C 1/02; B02C 1/00; B02C 1/08; B02C 1/043
See application file for complete search history.

(56) References Cited

U.S. PATENT DOCUMENTS

| | | | |
|---|---|---|---|
| 2,883,118 A | 4/1959 | Taylor |
| 8,109,459 B2 | 2/2012 | Nissen et al. |
| (Continued) | | |

FOREIGN PATENT DOCUMENTS

| | | | |
|---|---|---|---|
| AU | 2013339535 B2 | 5/2014 |
| AU | 2013339604 B2 | 5/2014 |
| AU | 2013339611 B2 | 5/2014 |
| (Continued) | | |

OTHER PUBLICATIONS

English translate (CN202343240U), retrieved date Mar. 13, 2025.*
(Continued)

*Primary Examiner* — Mohammed S. Alawadi
(74) *Attorney, Agent, or Firm* — Andrus Intellectual Property Law, LLP

(57) ABSTRACT

A braking system for use with a crusher having a moving crushing member and a stationary crushing member. The braking system is positioned and is operable to restrict rotational movement of the moving crushing member. The braking system includes a braking disc or plate and one or more braking yokes that each include a magnetic member, such as a permanent magnet or an electric magnet. The braking disc is formed from an electrically conductive material and is perpendicular to the magnets of the braking yoke. Relative movement between the braking disc and the braking yoke induces an eddy current in the braking disc. The induced eddy current creates a magnetic force that opposes rotational movement of the moving crushing member. The braking system can be used with a compact eccentric crusher to restrict the rotation of a crushing roller during an idle mode.

18 Claims, 7 Drawing Sheets

(56) References Cited

U.S. PATENT DOCUMENTS

2007/0029422 A1* 2/2007 Niemela .................. B02C 1/08
241/241.5
2025/0033062 A1* 1/2025 Szczelina .................. B02C 4/42

FOREIGN PATENT DOCUMENTS

| AU | 2018400359 B2 | | 7/2019 |
|----|---------------|---|--------|
| CN | 202343240 U | * | 7/2012 |
| DE | 10 2019 204 836 B3 | | 2/2020 |
| FR | 1057706 | | 3/1954 |
| WO | 2020200860 A1 | | 10/2020 |
| WO | 2023089552 A1 | | 5/2023 |

OTHER PUBLICATIONS

Anonymous: "Eddy current—Wikipedia, the free encylopedia", Jul. 14, 2014 (Jul. 14, 2014), XP055522127, Retrieved from the Internet: URL:https://web.archive.org/web/20140714030558/https://en.wikipedia.org/wiki/Eddy_current [retrieved on Nov. 8, 2018] the whole document.

International Search Report and Written Opinion for International Application No. PCT/US2024/015500, mailed Jun. 11, 2024.

* cited by examiner

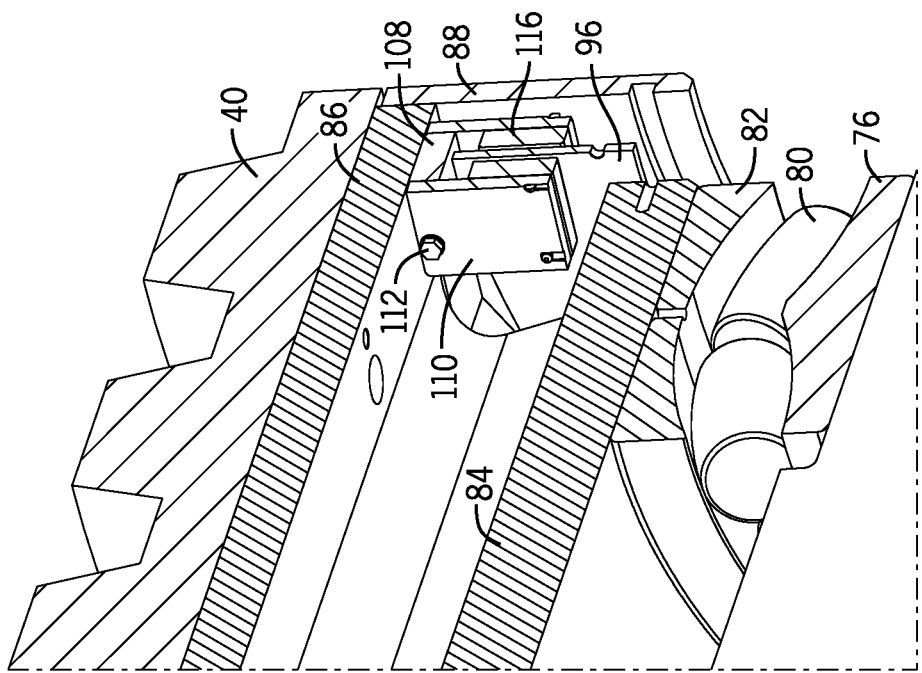
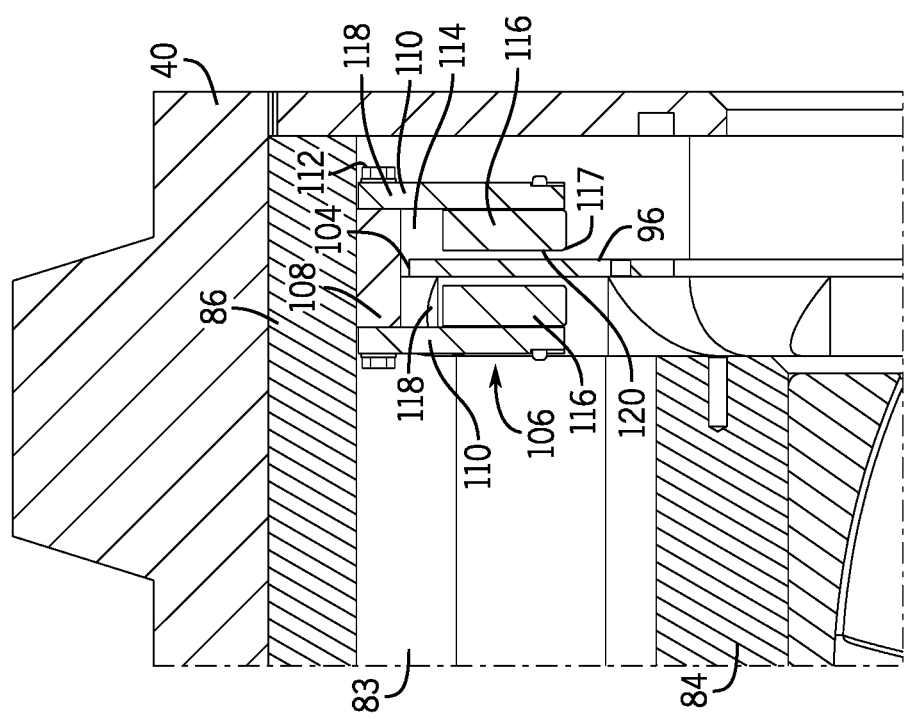
FIG. 7
FIG. 6

EDDY CURRENT BRAKE FOR A CRUSHER

BACKGROUND

The disclosed system generally relates to a braking system for use with a crusher having a stationary crushing member and a moving crushing member. More specifically, the present disclosure relates to a braking system that includes an eddy current brake that is used to restrict the rotation of the moving crushing member of a crusher.

Presently, different types of crushers are being used to reduce the size of mineral material present in an infeed to the crusher. After processing, the size of the mineral material has been reduced to create a supply of the mineral material having smaller sized individual components. In these types of crushers, a moving crushing member moves toward and away from a stationary crushing member to create a varying crushing gap to crush the mineral material of the infeed.

One type of crusher used to reduce the size of mineral material is referred to as a compact eccentric crusher. In a compact eccentric crusher, a freely rotatable crushing roller is mounted to an eccentric shaft by a series of roller bearings. The crushing roller is spaced from a stationary crushing jaw. In the compact eccentric crusher, the eccentric arrangement of the crushing roller on the eccentric drive shaft creates movement of the crushing roller toward and away from the stationary crushing jaw. This movement varies the size of the crushing gap, which causing the mineral material fed into the compact eccentric crusher to be crushed in the crushing gap.

During operation, the freely rotatable mounting of the crushing roller on the eccentric drive shaft results in a slow rotation of the crushing roller about the eccentric drive shaft in a direction opposite to the rotation of the eccentric drive shaft. Although the crushing force is created by the lateral movement of the crushing roller relative to the stationary crushing jaw, the free rotation of the crushing roller distributes wear to all portions of the outer circumference of the crushing roller.

When the compact eccentric crusher operates in an idle mode with no material present for crushing, the internal friction in the roller bearing mounting the crushing roller to the eccentric drive shaft results in the crushing roller rotating along with the eccentric drive shaft at the rotational speed of the drive shaft.

As the crushing roller is rotating with the eccentric drive shaft, if a supply of mineral material is fed into the crushing chamber and the crushing gap, the material will contact the outer surface of the crushing roller and immediately brake the rotation of the crushing roller, This immediate braking creates extreme impulse forces in the roller bearings and the support structure, which over time will reduce the life span of these components. As a result, friction-based braking systems have been used to reduce and restrict the rotation of the crushing roller. However, these friction-based braking systems tend to wear quickly and must be replaced. Further, friction-based braking systems need some type of actuator and control system in order to provide the braking force only at the desired times.

Therefore, the inventors have recognized a need for a braking system in a crusher to restrict the rotation between a stationary crushing element and a moving crushing element without the need for any actuator or control system and without the need for replacement due to wear from friction.

SUMMARY

The present disclosure relates to a braking system for use with a crusher having a stationary crushing member and a moving crushing member. More specifically, the present disclosure relates to a braking system that includes an eddy current brake that is used to restrict the rotational speed of the moving crushing member of a crusher.

In accordance with one embodiment of the present disclosure, a crusher for crushing a supply of mineral material is provided. The crusher includes a stationary crushing member and a moving crushing member. The moving crushing member is spaced from the stationary crushing member by a crushing gap. During operation of the crusher, the moving crushing member is movable toward and away from the stationary crushing member to crush the mineral material within the crushing gap. As the crusher operates, the moving crushing member may rotate. The crusher further includes an inductive current braking system that is operable to create a braking force that restrict the rotational movement of the moving crushing element.

In one contemplated embodiment, the inductive current braking system includes a braking disc that is formed from an electrically conductive material, such as but not limited to copper or aluminum, although other conductive materials are possible. The braking disc is positioned such that the braking disc moves through one or more braking yokes that each include a magnetic material. As the braking disc moves past or through the braking yokes, a braking force is generated that opposes the rotational movement of the moving crushing member. The braking disc and the braking yoke are mounted such that there is relative movement between the components during the rotational movement of the moving crushing member.

In one contemplated embodiment, the braking yoke includes a pair of permanent magnets and the braking disc passes between the pair of spaced permanent magnets. In another contemplated embodiment, the braking yoke can include a pair of electric magnets that can be selectively activated and deactivated to help control the generation of the braking force.

The crusher can be one of several different types of crushers, such as a compact eccentric crusher that includes a crushing roller and a stationary crushing jaw. In a compact eccentric crusher, the crushing roller is mounted to a rotating eccentric shaft by a series of bearings. In such an embodiment, the braking disc is preferably stationary and the braking yokes are mounted to the crushing roller and thus movable with the crushing roller. During an idle mode, the crushing roller rotates with the rotation of the eccentric shaft. As the crushing roller rotates around the stationary braking disc, the braking force is generated to restrict the rotational speed of the crushing roller.

The braking system of the present disclosure utilizes an eddy current created by the relative movement of a braking disc and magnets in a braking yoke to generate a magnetic field and the braking force. The braking system can be used in different types of crushers to limit or restrict the rotation of a moving crushing member without the need for a friction brake.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 6 is a magnified view taken along line 6-6 of FIG. 5;

FIG. 7 is a view of the braking yoke and braking disc; and

DETAILED DESCRIPTION

Figure 1:
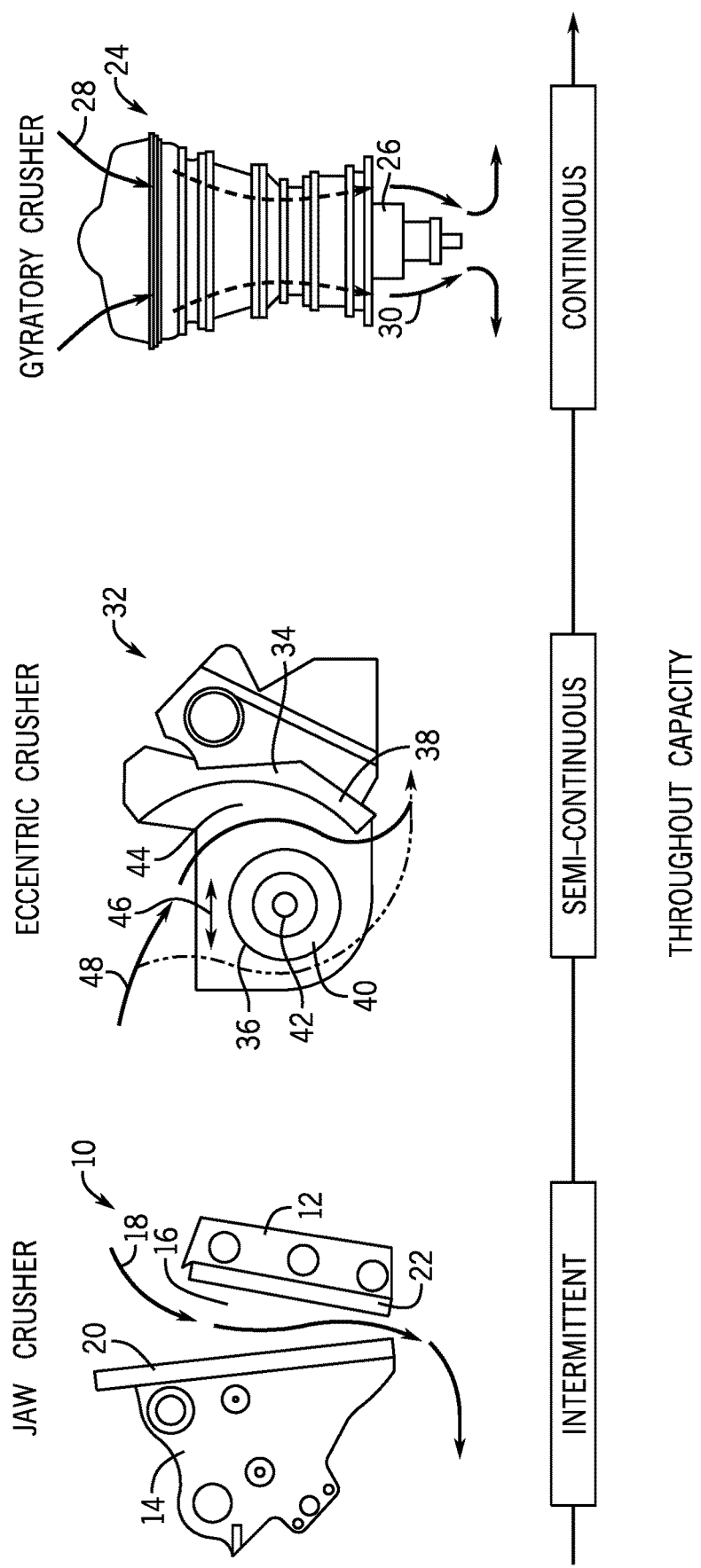
FIG. 1 is an illustrative view of several different types of crushers that are each operable to crush an infeed of mineral material.

FIG. 1 illustrates multiple different types of crushers that can be used in crushing and reducing the size of hard rocks and stone in mines and quarries. In FIG. 1, a first type of crusher, referred to as a jaw crusher, is shown by reference numeral 10. The jaw crusher 10 includes a stationary crushing member 12 and a moving crushing member 14. The moving crushing member 14 that is movable toward and away from the stationary crushing member 12 to crush a supply of mineral material entering into a crushing gap 16, as shown by the arrows 18. In the jaw crusher 10, the moving member 14 is a moving jaw having a first wear surface 20 that traps the mineral material between a second wear surface 22 formed on a stationary jaw of the stationary crushing member 12. The first and second wear surfaces can be replaced after extended periods of use.

A second type of crusher, referred to as a gyratory crusher 24, includes an internal crushing head having an outer wear surface that moves in a gyratory pattern within a stationary bowl including an outer wear surface. The gyratory crushing head is mounted to a main shaft 26 that is moved by an eccentric. The movement of the eccentric creates the gyratory movement of the crushing head within the stationary bowl. The crushing head functions as the moving crushing member while the stationary bowl functions as a stationary crushing member. The stationary and moving crushing members of the gyratory crusher 24 create a crushing gap therebetween such that the infeed flow of mineral material, shown by arrows 28, is crushed within the crushing gap to create a product flow 30 out of the lower end of the gyratory crusher. The product flow 30 has particle sizes smaller than the particle sizes that are included in the infeed mineral material flow illustrated by arrow 28. As is well-known, the gyratory crusher is designed such that the gyratory movement of the crushing head within the gyratory crusher 24 takes place with little or no crushing head spin such that the primary movement of the crushing head is toward and away from the stationary crushing member to increase and decrease the size of the crushing gap to process the mineral material.

FIG. 1 further illustrates a third type of crusher, referred to as a compact eccentric crusher, which is shown by reference numeral 32. The compact eccentric crusher 32 includes a stationary crushing member 34 and a moving crushing member 36. In the compact eccentric crusher 32, the stationary crushing member is a stationary jaw 38 while the moving crushing member is a crushing roller 40. The crushing roller 40 is mounted to an eccentric drive shaft 42 that is rotatable by a drive motor. As the eccentric shaft 42 rotates, the crushing roller 40 moves along an eccentric path toward and away from the stationary jaw 38 to vary the size of the internal crushing gap 44. The eccentric movement of the crushing roller is schematically shown by arrow 46 in FIG. 1. The movement of the crushing roller 40 creates a varying size crushing gap 44 which acts to crush the flow of mineral material entering into the crushing gap 44, which is shown by arrow 48.

As can be understood by the description of the three different types of crushers shown in FIG. 1, each of the crushers includes a stationary crushing member and a moving crushing member that combine to open and close a crushing gap to crush the supply of mineral material fed to the specific crusher.

Figure 2:
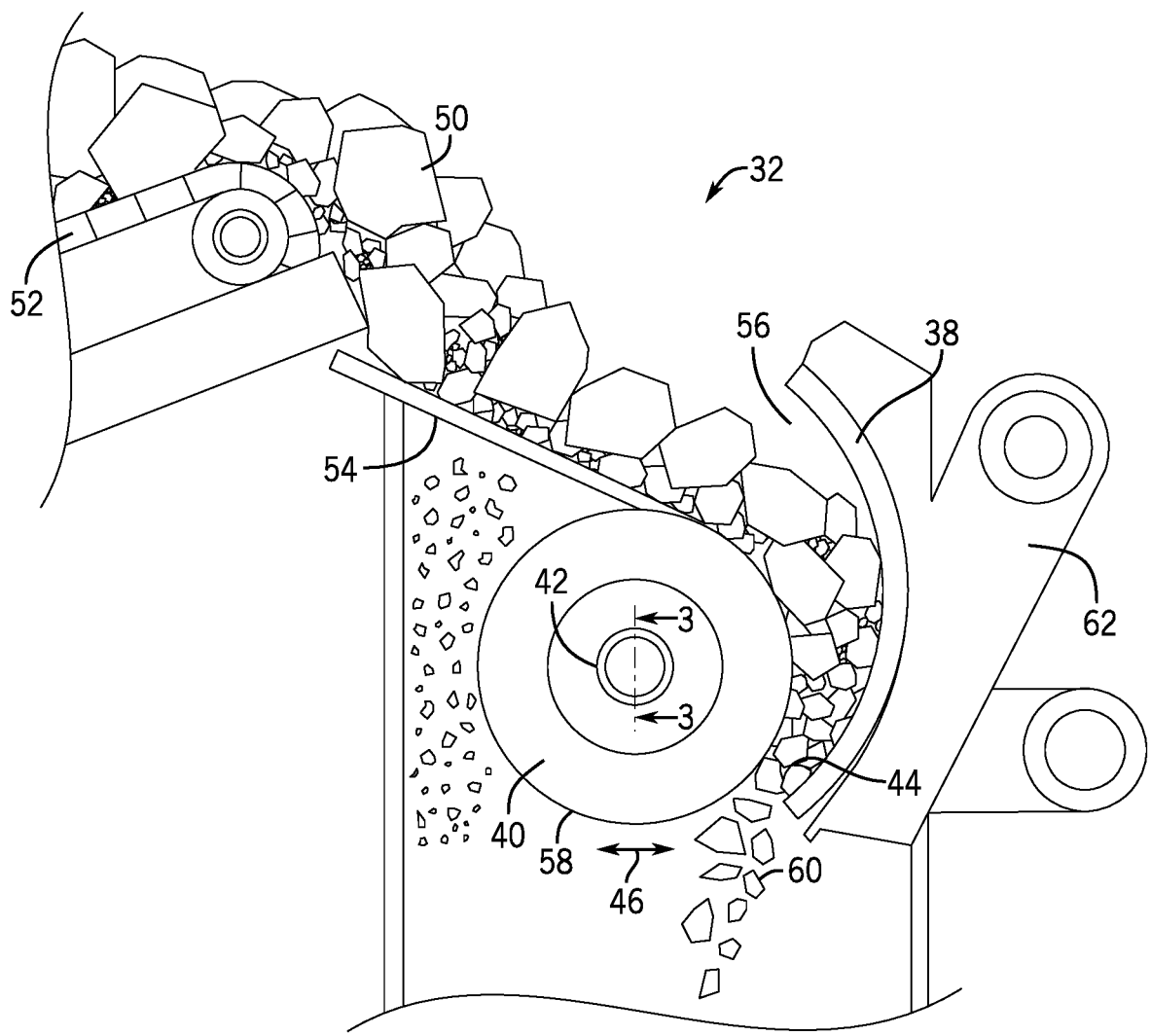
FIG. 2 is a side view of a compact eccentric crusher that includes a stationary crushing member and a moving crushing member.

FIG. 2 further illustrates a specific configuration of a compact eccentric crusher 32. As illustrated in FIG. 2, the compact eccentric crusher 32 receives a supply of mineral material 50 from an infeed conveyor 52. In the embodiment shown, the supply of mineral material 50 may fall upon an infeed screen 54 that includes slots or other openings that allow particles of a small enough size to bypass the primary crushing operation. The infeed screen 54 directs the larger particles of the supply of mineral material into a crushing chamber 56. In other contemplated embodiments, the infeed screen 54 could be eliminated such that the entire supply of material would be directed to the crushing chamber 56.

The crushing chamber 56 is generally formed between the stationary jaw 38 and the outer surface 58 of the crushing roller 40. As will be described in greater detail below, the crushing roller 40 is mounted to an eccentric drive shaft 42 that creates eccentric movement of the outer surface 58 along an eccentric path that includes movement toward and away from the stationary jaw 38, as schematically illustrated by arrow 46. The movement of the entire crushing roller 40 increases and decreases the size of the crushing gap 44. The increase and decrease in the size of the crushing gap 44 crushes the larger particles of the infeed stream to result in an outlet product flow 60.

In addition to the movement of the entire crushing roll 40, the position of the crushing jaw 38 can be modified through movement of the support arm 62. However, during the crushing operation, it is the movement of the crushing roller 40 relative to the stationary jaw 38 that creates the crushing forces to convert the inlet product flow to the outlet product flow 60.

During operation of the compact eccentric crusher 32 with a supply of mineral material to be crushed, the crushing forces created at the crushing gap cause the crushing roller 40 to rotate in a direction opposite to the rotation of the eccentric shaft at very low RPM. As an illustrative example in FIG. 2, the eccentric shaft 42 will be rotating in a clockwise direction while the crushing forces created in the crushing gap 44 will create rotation of the crushing roller 40 in a counterclockwise direction. When no material is present and the compact crusher 32 is in an idle mode, the crushing roller 40 will eventually rotate in coordination with the rotation of the eccentric shaft 42 at the same rotational speed and in the same rotational direction. In some embodiments, the crushing roller can thus be rotating between 100 to 200 RPM in the idle mode.

Figure 3:
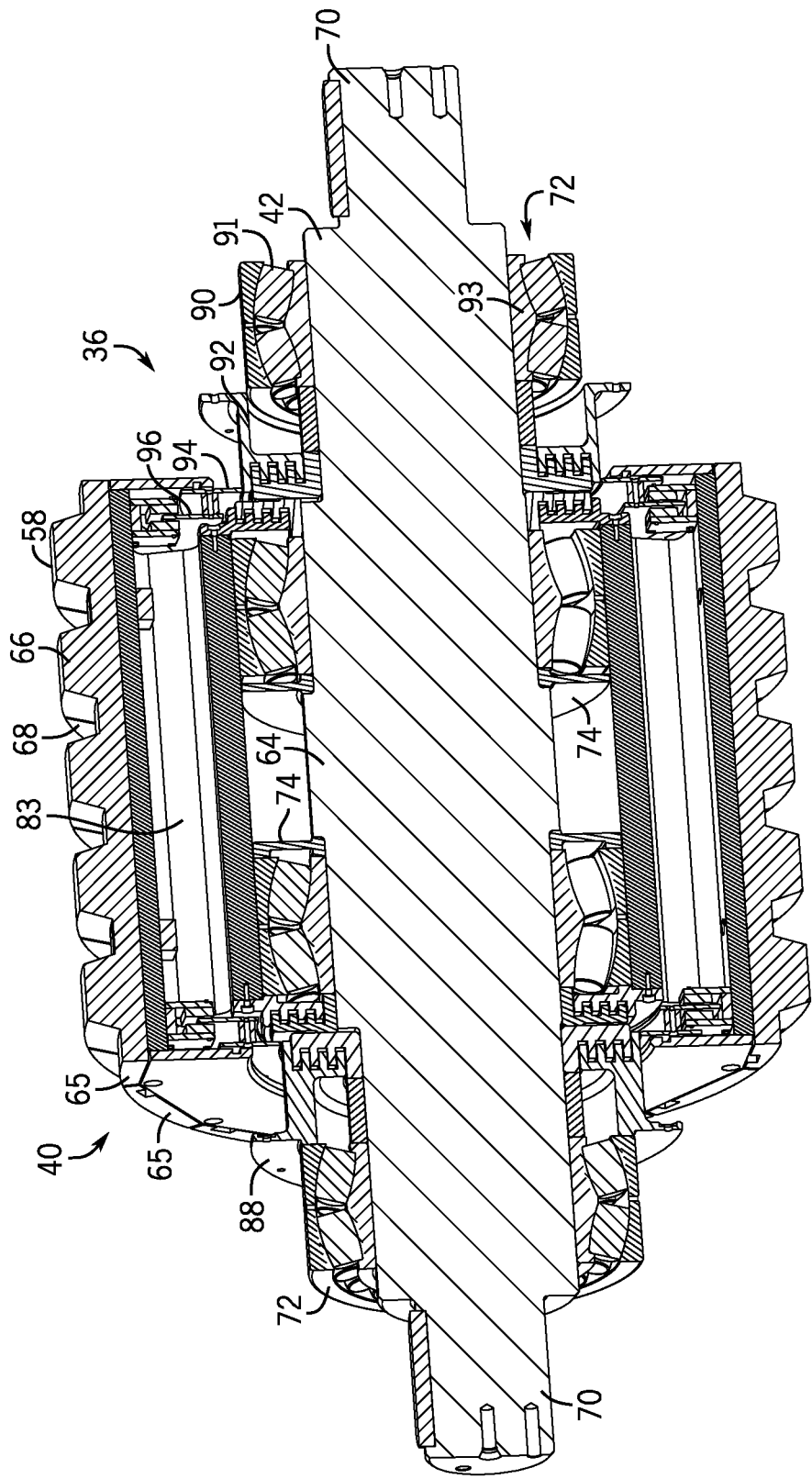
FIG. 3 is a section view taken along line 3-3 of FIG. 2 showing the mounting of the crushing roller to a rotating eccentric shaft.

FIG. 3 illustrates a cross-section view of the moving crushing member 36 that forms part of the compact eccentric crusher 32 shown in FIG. 2. The moving crushing member includes the crushing roller 40 that is rotatably mounted to the eccentric shaft 42. As shown in FIG. 3, the eccentric shaft 42 includes a variable radial thickness around its outer circumference such that rotation of the eccentric shaft 42 creates the eccentric movement of the crushing roller 40 as shown by arrow 46 in FIG. 2. In the cross-sectional view of FIG. 3, the increased radial thickness of the eccentric shaft is shown at area 64.

In the embodiment shown in FIG. 3, the crushing roller 40 includes a series of roll liners 65 that are each mounted to a roller support hub 83. The roll liners 65 are replaceable wear components mounted to the roller support hub 83 for easy replacement upon wear. When the roll liners 65 are mounted to the roller support hub 83, the roll liners 65 define the outer contact surface 58 of the crushing roller 40. As shown, the outer surface 58 is defined by a series of extended ridges 66 that are each spaced by a series of grooves 68. The ridges 66 and grooves 68 provide for a more robust outer crushing surface 58 for the crushing roller 40.

As shown in FIG. 3, the eccentric shaft 42 includes a pair of stub ends 70 that are connected to drive wheels (not shown), which in turn are connected to drive motor operable to create the rotational movement of the entire eccentric shaft 42. The eccentric shaft 42 includes a pair of outer bearings 72 and a pair of inner bearings 74. The outer bearings 72 provide rotational support for the eccentric shaft 42 on a support frame (not shown) while the inner bearings 74 provide rotational support for the crushing roller 40. During operation of the compact eccentric crusher, the crushing roller 40 is freely rotatable about the eccentric drive shaft 42.

Figure 4:
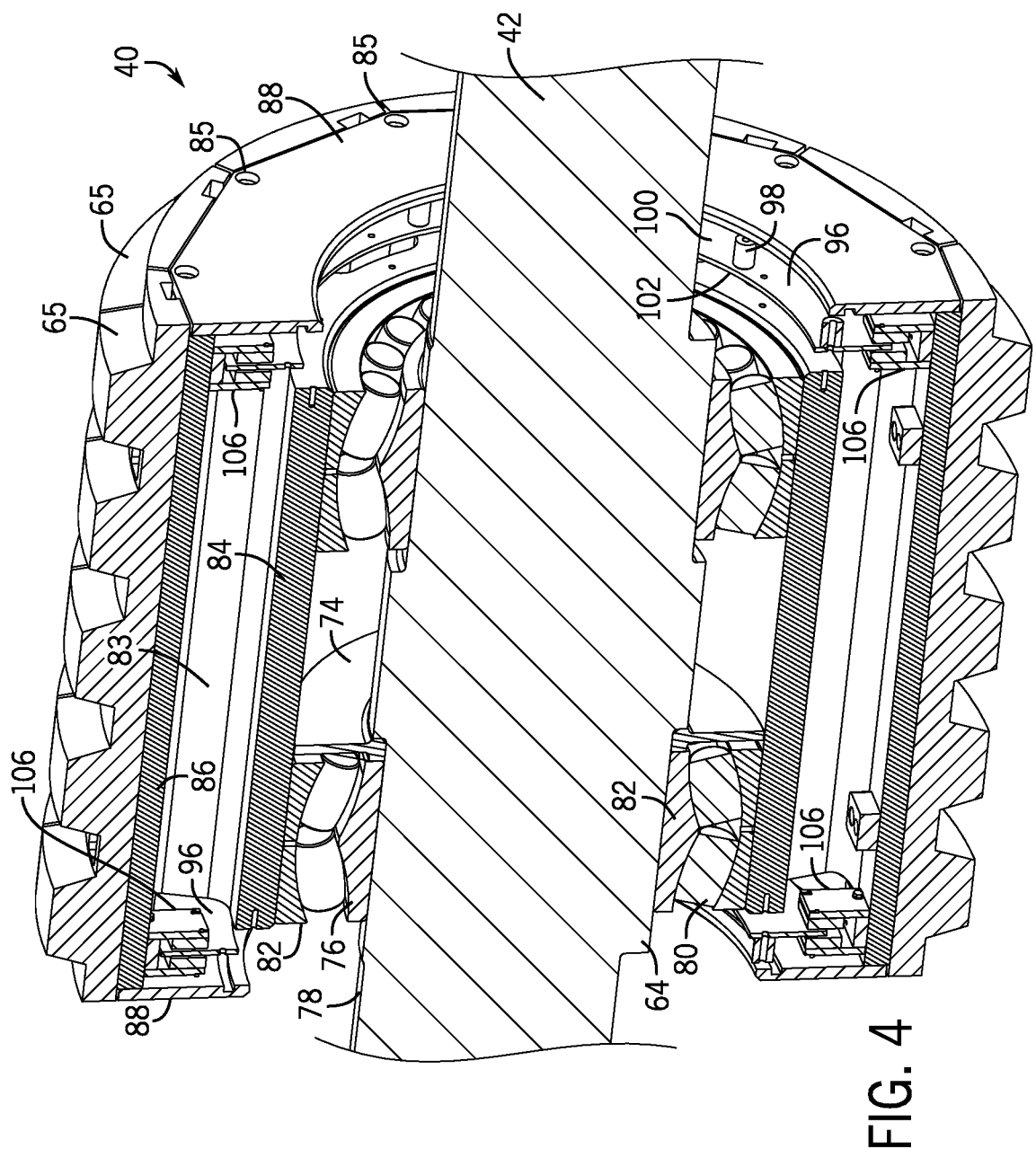
FIG. 4 is a magnified section view showing the location of the braking system of the present disclosure.

Referring now to FIG. 4, the details of each of the pair of inner bearings 74 will now be described. Each of the inner bearings 74 includes an inner race 76 that is securely mounted to the outer surface 78 of the eccentric shaft 42. The inner race 76 supports a series of individual rollers 80 that are positioned between the inner race 76 and a corresponding outer race 82. The outer race 82 is securely mounted to an inner support wall 84 of the roller support hub 83. The support hub 83 includes support walls that extend between the inner support wall 84 and an outer support wall 86. In the embodiment illustrated, the entire roller support hub 83 is a unitary cast component that provides the required structural stability for the series of roll liners 65. As shown in FIG. 4, the individual roll liners 65 are securely attached to the outer support wall 86 such that the combination of the support hub 83 and the series of roll liners 65 define the crushing roller 40. The crushing roller 40 further includes a pair of annular end walls 88 that are also mounted to the ends of the support hub 83 through a series of connectors that pass through the connecting openings 85. The end walls 88 rotate as part of complete crushing roller 40, along with the rotation of the outer race 82 of the inner bearings 74.

During operation of the compact eccentric crusher 32 shown in FIG. 2 without any material present, which is referred to as an idling mode, the rotation of the eccentric shaft 42 is transmitted to rotation of the crushing roller 40 through the bearing friction in each of the inner bearings 74. After enough time in the idling mode, the crushing roller 40 will rotate in sync with the rotation of the eccentric shaft 42. When the supply of mineral material is initially fed into the crushing chamber 56, the larger diameter stones will enter into the crushing gap, which will result in a nearly instantaneous braking of the rotation of the crushing roller 40. This near instantaneous termination of the rotation of the crushing roller will create extreme impulsive forces that are induced in the inner bearings 74 and the support structure, including the roller support hub 83. Such extreme impulse forces created during the interruption in rotation of the crushing roller 40 upon the introduction of the infeed stream of mineral material after an extended period in the idling mode increases wear and failure of the internal components.

As a result, a braking system was designed and included in the compact eccentric crusher.

Figure 5:
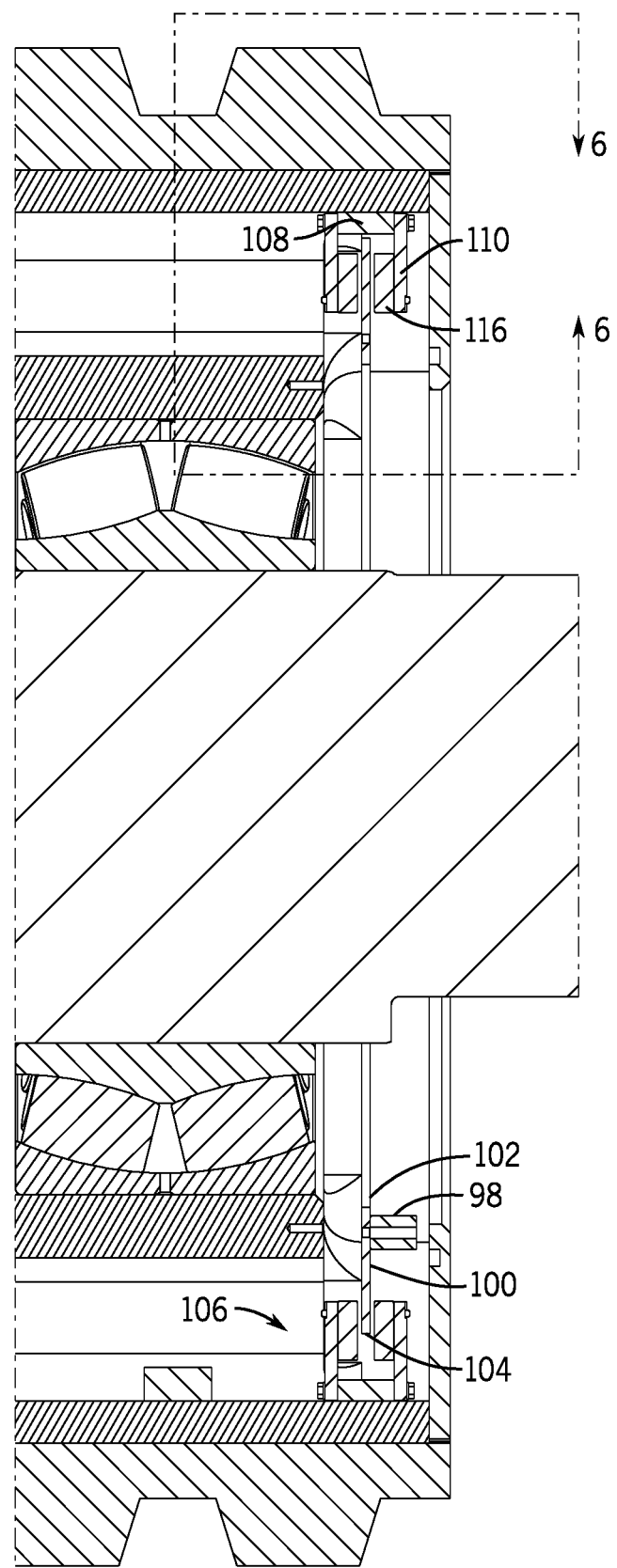
FIG. 5 is further magnified view showing the braking system.

Referring back to FIG. 3, the outer race 90 of each of the outer bearings 72 is isolated from the rotation of the eccentric shaft 42 by the series of rollers 91 located between the outer race 90 and the inner race 93. In this manner, the outer race 90 can remain stationary while the inner race 93 rotate with the eccentric shaft. As illustrated, the outer race 90 is joined to a support bracket 92. The support bracket 92 is designed to be securely mounted to the outer race 90 and is thus stationary during the rotational movement of the eccentric shaft 42. The support bracket 92 in turn is mounted to a support plate 94, which is also stationary relative to the rotating eccentric shaft 42. The support plate 94 is connected to a braking disc 96 through a series of connecting standoffs 98, which are best shown in FIG. 4. The braking disc 96, through its connections to the mounting plate 94 and support bracket 92, is a stationary member even during the rotational operation of the eccentric shaft 42. In the embodiment shown in FIG. 4, the braking disc 96 has an annular configuration and includes a main body 100 defined by an inner edge 102 and an outer edge 104, as is best shown in FIG. 5. Although the braking disc 96 has an annular shape in the illustrated embodiment, the braking disc 96 could be a plate or other flat shape that has other configurations, such as a circular plate, annular segments, or other similar shapes.

Referring back to FIG. 4, a pair of braking disc 96 are included, where each of the braking discs 96 are mounted inside the end walls 88 at each end of the crushing roller 40. The braking discs 96 are included as one part of the braking system of the present disclosure. As stated above, each of the braking discs 96 are stationary relative to the rotational movement of the crushing roller 40. The braking discs 96 form one part of an eddy current braking system that is designed for use with the eccentric roll crusher 32 of the present disclosure.

The second component that forms part of the eddy current braking system of the present disclosure along with the stationary braking discs 96 are a series of braking yokes 106. In the embodiment shown in FIG. 4, two braking yokes 106 are positioned at each end of the crushing roller 40. However, it is contemplated that fewer or greater numbers of braking yokes 106 could be utilized at each end of the crushing roller 40 while operating within the scope of the present disclosure.

Referring now to FIGS. 5-7, the details of each of the individual braking yokes 106 will be described. As shown in FIG. 6, the braking yoke 106 includes a mounting block 108 that is securely attached to the outer support wall 86 formed as part of the roller support hub 83. The mounting block 108 provides a point of attachment for a pair of support arms 110. Each of the support arms 110 is mounted to the mounting block 108 by a connector 112. The support arms 110 extend radially inward from the outer support wall 86 and are spaced from each other to define a receiving cavity 114 therebetween. The receiving cavity 114 is sized such that it can receive the braking disc 96. As shown in FIG. 6, the outer edge 104 of the braking disc 96 is spaced radially inward from the mounting block 108 such that the braking yoke 106 can rotate freely relative to the stationary braking disc 96.

In the embodiment shown in FIGS. 5-7, each of the braking yokes 106 includes a pair of permanent magnets 116 mounted to an inner surface 118 of the support arms 110. The permanent magnets 116 each include an outer surface 120 that are spaced from each other by a distance greater than the thickness of the braking disc 96. The pair of permanent magnets 116 are oriented such that the north pole of one permanent magnet 116 faces the south pole of the other permanent magnet 116. In such orientation, the pair of magnets 116 create a toroidal magnetic field.

As shown, the braking disc 96 is perpendicular to the pair of support arms 110 and can pass between the pair of spaced permanent magnets 116 during operation of the crusher and the rotational movement of the crushing roller 40. The braking disc 96 is oriented perpendicular to the toroidal magnetic field created by the magnets 116 such that movement of the braking yokes 106 causes the braking disc 96 to move perpendicularly through the toroidal magnetic field, which induces an eddy current in the braking disc 96.

When the braking disc 96 is located between the pair of permanent magnets 116, an air gap 117 is defined on each side of the braking disc 96 and one of the permanent magnets 116. The size of the air gap 117 is selected to help dictate the braking force created by the braking system, as will be described in more detail below. Although permanent magnets 116 are mounted to each of the support arms 110, it is contemplated that the permanent magnets 116 could be replaced with electric magnets that are connected to a supply of electric power. One advantage for using electric magnets would be the selective activation and deactivation of the braking system by turning on and off the electric magnets. Further, the power of the magnetic field can be changed and controlled through use of electric magnets.

Referring back to FIG. 4, the embodiment illustrated, the pair of braking yokes 106 are spaced 180° apart from each other. However, it should be understood that in an embodiment in which four braking yokes 106 are used on each end of the crushing roller 40, the braking yokes 106 would be spaced equally from each other at a rotational angle of 90°. In an embodiment in which three braking yokes 106 are utilized, the braking yokes 106 would be spaced at an angular position of 120° from each other. Increasing or decreasing the number of braking yokes 106 increases or decreases the braking force created in the manner as will be described in detail below.

In accordance with the present disclosure, the braking system will function as an eddy-current braking system as follows. In the embodiment illustrated, the braking disc 96 is formed from an electrically conductive material and is designed to be stationary during the operation of the crusher including the rotating eccentric shaft 42 and the drive roller 40. As previously described, each of the braking yokes 106 includes a pair of permanent magnets 116 that are spaced from each other and are located on opposite sides of the braking disc 96, as best shown in FIGS. 6 and 7.

During the idling mode in which no mineral material is being fed into the crushing gap, the crushing roller 40 will begin to rotate along with the rotation of the eccentric shaft 42 due to the internal friction created within the internal bearings 74. As the braking yokes 106 begins to rotate with the crushing roller 40, the permanent magnets 116 included in each of the braking yokes 106 will move around the stationary electrically conductive material of the braking disc 96. This relative movement of the electrically conductive material of the braking disc 96 through the magnetic field created by the pair of spaced permanent magnets 116 will induce an electric eddy current in the conductive material that forms the braking disc 96. This induced electric eddy current will begin to create an additional magnetic field that will interact with the magnetic field created by the permanent magnets 116. The induced magnetic field formed in the braking disc will create a force that opposes the rotation of the braking yokes 106 relative to the stationary braking disc 96. As the speed of rotation of the crushing roller 40 and the braking yokes 106 mounted thereto increases, the magnetic field induced into the stationary braking disc 96 increases, further opposing the rotation of the crushing roller. Thus, the use of the braking system of the present disclosure creates a braking force between the stationary braking disc 96 and the rotating braking yokes 106, thereby restricting the rotational speed of the crushing roller 40, such as during the idling mode.

Although the present disclosure shows stationary braking discs 96 and moving braking yokes 106, it should be understood that the braking discs 96 could be moving and the braking yokes 106 could be stationary. As described, it is the relative movement between the braking discs 96 and the braking yokes 106 that create the eddy current and the opposing magnetic fields.

In one embodiment of the present disclosure, the braking disc 96 is formed from an electrically conductive material, such as but not limited to aluminum, copper, gold or silver, and is formed in a disc shape. It is contemplated that a preferred choice for the electrically conductive material would be a non-ferromagnetic material, but any electrically conductive material could be possibly used. The type of electrically conductive material selected will increase or decrease the magnetic braking force created during the rotation of the crushing roller. In addition, the braking force can be adjusted by increasing or decreasing the number of braking yokes 106 utilized, increasing or decreasing the air gap 117 between the permanent magnet 116 and the braking disc, increasing or decreasing the strength of the permanent magnets 116, increasing or decreasing the radial height of the permanent magnets 116 or by increasing or decreasing the radial position of the braking yokes 106 relative to the outer edge 104 of the braking disc 96. By changing any or all of these various adjustment parameters, the braking system of the present disclosure can be modified to either increase or decrease the braking force applied to restrict the rotating movement of the crushing roller.

Figure 8:
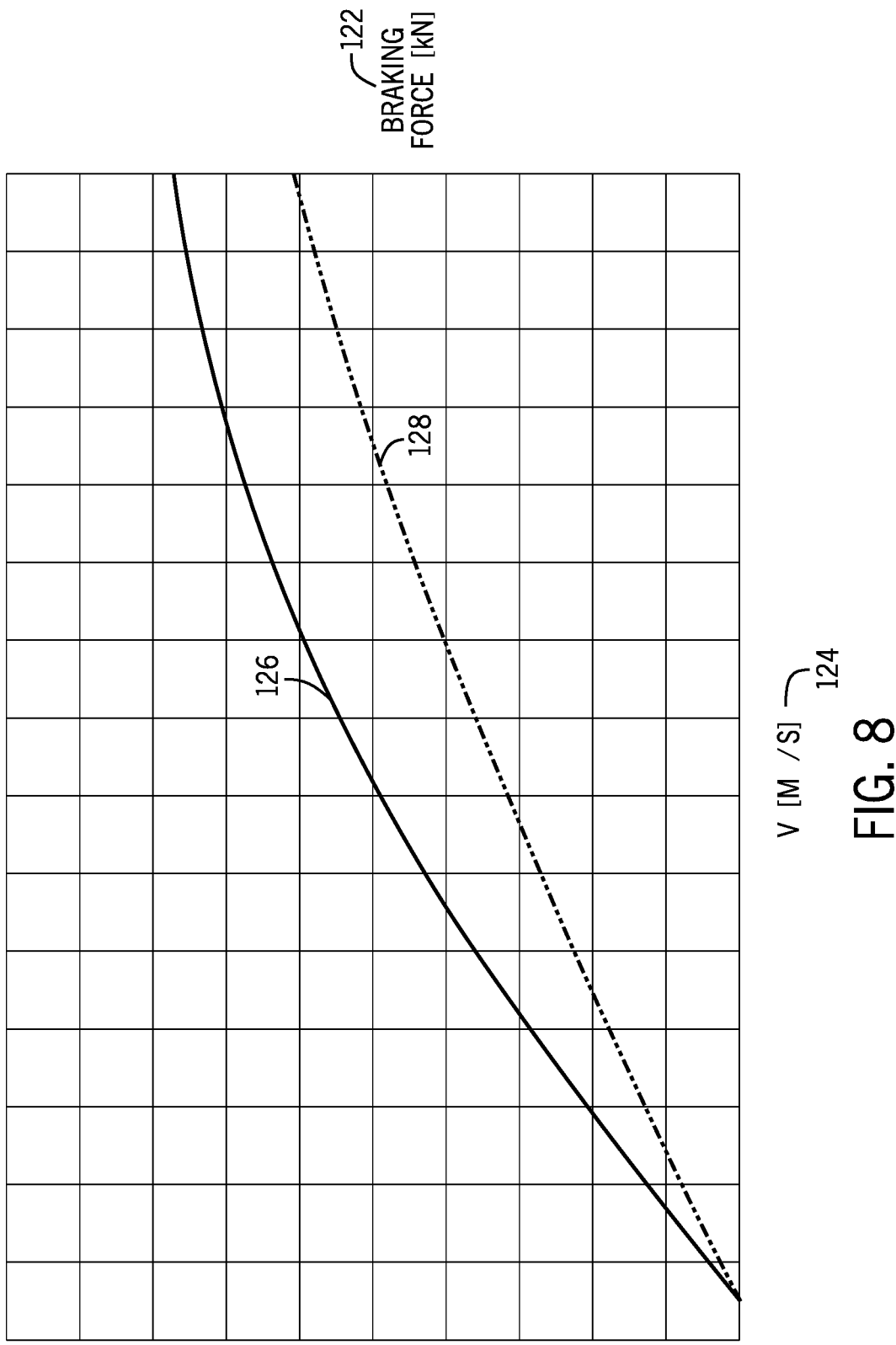
FIG. 8 is a graph illustrating the relationship between the braking force and the rotational speed for two materials used to form the braking disc.

FIG. 8 illustrates one embodiment of the relationship between the braking force 122 shown along the vertical axis and the rotational speed 124 shown along the horizontal axis. The solid line 126 represents a braking disc formed from copper while the dashed line 128 represents a braking disc formed from aluminum. As can be understood in FIG. 8, as the rotational speed 124 increases, the braking force, which is the opposing magnetic field induced in the braking disc also increases. In a braking disc formed from copper, the braking force is larger than the braking force in a braking disc formed from aluminum. It should be understood that other electrically conductive materials could be utilized for the braking disc other than the copper and aluminum shown in the graphs of FIG. 8.

The present disclosure also relates to a method of restricting the rotation of a moving crushing member during the operation of a crusher that includes both a stationary crushing member and a moving crushing member. In accordance with the method of the present disclosure, the crusher is provided with an inductive current braking system that is operable to create a magnetic braking force to restrict the rotational movement of the moving crusher member. The inductive current braking system is mounted in a position such that the inductive current braking system can generate the magnetic braking force on the moving crushing member.

In one exemplary embodiment, the inductive current braking system includes a braking disc formed from an electrically conductive material and at least one braking yoke that includes permanent or electric magnets. In accordance with the method of the present disclosure, one of the braking disc and the braking yoke is mounted to the moving crushing member while the other component is stationary. The relative movement between the braking disc and the braking yoke creates the magnetic braking force.

In an embodiment in which the crusher is a compact eccentric crusher, the moving crusher includes a crushing roller mounted to an eccentric shaft. In this embodiment, the method of the present disclosure includes mounting the braking disc in a stationary position and the one or more braking yokes is mounted to the crushing roller for rotation with the crushing roller. During rotating movement of the crushing roller, the inductive current braking system generates the magnetic braking force to restrict the rotation of the crushing roller.

In an embodiment in which the braking yokes include electric magnets, the method of the present disclosure includes the step of activating the electric magnets. When the electric magnets are active, the rotation of the braking disc relative to the braking yokes creates the braking force. The method further includes the step of selecting properties of the braking disc and the braking yokes to control the braking force. These properties can include the size of the magnets in the braking yoke, the material used to form the braking disc, the spacing between the braking disc and the braking yoke, the depth of overlap between the braking disc and the braking yoke as well as other parameters.

As can be understood by the above description, the braking system of the present disclosure, which includes the braking discs and braking yokes, has the distinct advantage of not requiring any frictional interaction between the rotating crushing roll and the braking system in order to restrict the rotational speed of the crushing roll. Further, no outside controls are required to apply the braking force, since the braking force is created based upon the induced magnetic field generated during the rotation of the crushing roller relative to the stationary braking disc. Further, at low working speeds such as 0.5 to around 5 RPM, barely any braking force is created, which has the benefit of eliminating any unwanted energy dissipation during normal crushing operation.

Although the braking system of the present disclosure is primarily shown with use in a compact eccentric crusher, it should be understood that the braking system could be utilized in any type of crusher in which there is a need for braking rotating parts. As an example, in a cone crusher, the braking system of the present disclosure could be positioned between the crushing head and a stationary component to prevent unwanted head spin during operation. In cone crushers, during the idling operation, head spin has proven to be an issue that must be limited. The use of a braking system that includes a stationary member and a rotating member that induce an opposing magnetic field to restrict rotation is possible and contemplated as being within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A crusher for crushing a supply of mineral material, the crusher comprising:
    a stationary crushing member;
    a moving crushing member spaced from the stationary crushing member by a crushing gap, wherein the moving crusher member is a crushing roller mounted to an eccentric shaft such that a rotation of the eccentric shaft creates an eccentric movement of the crushing roller toward and away from the stationary crushing member to change the crushing gap and crush the mineral material within the crushing gap; and
    an inductive current braking system operable to create a magnetic braking force to restrict a rotational movement of the crushing roller, wherein the inductive current braking system comprises:
        a braking yoke including a magnetic material; and
        a braking disc formed from an electrically conductive material that is received in the braking yoke,
        wherein the braking yoke and the braking disc are rotationally movable relative to each other to induce the magnetic braking force that restricts the rotational movement of the crushing roller.

2. The crusher of claim 1 wherein the braking disc is stationary and the braking yoke is mounted to the crushing roller for rotation with the crushing roller.

3. The crusher of claim 1 wherein the magnetic material of the braking yoke is a permanent magnet and the braking disc moves past the permanent magnet.

4. The crusher of claim 1 wherein the magnetic material of the braking yoke is an electric magnet.

5. The crusher of claim 1 wherein the crusher includes a plurality of braking yokes and the braking disc moves through each of the plurality of braking yokes.

6. A braking system for use with a crusher having a stationary crushing member and a moving crushing member that are spaced from each other to define a crushing gap, the moving crushing member including a crushing roller mounted to an eccentric shaft such that a rotation of the eccentric shaft creates an eccentric movement of the crushing roller relative to the crushing gap, the braking system comprising:
    a braking disc formed from an electrically conductive material; and
    at least one braking yoke including a magnetic material, wherein the braking disc and the at least one braking yoke are mounted on the crusher such that a relative movement between the braking disc and the at least one braking yoke induces a magnetic braking force that opposes a rotational movement of the moving crushing roller.

7. The braking system of claim 6 wherein the braking disc is stationary and the at least one braking yoke rotates relative to the stationary braking disc.

8. The braking system of claim 6 wherein the crusher is a compact eccentric crusher and the stationary crushing member is a stationary jaw and the rotation of the eccentric shaft creates the eccentric movement of the crushing roller into and out of the crushing gap.

9. The braking system of claim 8 wherein the crushing roller is mounted to the eccentric shaft by a plurality of bearings such that the crushing roller is rotatable about the eccentric shaft, wherein the braking system restricts the rotation of crushing roller about the eccentric shaft.

10. The braking system of claim 9 wherein the at least one braking yoke is mounted for a rotational movement with the crushing roller and the braking disc is stationary relative to the rotational movement of the crushing roller.

11. The braking system of claim 10 wherein the at least one braking yoke comprises a plurality of braking yokes spaced around the crushing roller.

12. The braking system of claim 11 wherein each of the plurality of braking yokes includes at least one permanent magnet and the braking disc passes through each of the plurality of braking yokes.

13. A compact eccentric crusher having a stationary jaw and a crushing roller mounted to an eccentric shaft such that a rotation of the eccentric shaft creates an eccentric movement of the crushing roller into and out of a crushing gap, the crusher comprising:

- at least one braking yoke is mounted for a rotational movement with the crushing roller;
- a stationary braking disc formed from an electrically conductive material that is received in the at least one braking yoke, wherein the at least one braking yoke rotates around the braking disc, wherein rotation of the at least one braking yoke relative to the braking disc induces a magnetic braking force that opposes the rotational movement of the crushing roller.

14. The compact eccentric crusher of claim 13 wherein the at least one braking yoke comprises a plurality of braking yokes spaced around the crushing roller.

15. The compact eccentric crusher of claim 14 wherein each of the plurality of braking yokes includes at least one permanent magnet and the braking disc moves past the at least one permanent magnet of each of the plurality of braking yokes to induce the magnetic braking force.

16. The compact eccentric crusher of claim 15 wherein each of the plurality of braking yokes includes a pair of spaced support arms each supporting a permanent magnet, wherein the braking disc moves between the permanent magnets of the each of the braking yokes.

17. The compact eccentric crusher of claim 13 wherein the at least one braking yoke includes a magnetic element, wherein the rotation of the at least one braking yoke relative to the stationary braking disc induces an eddy current in the braking disc.

18. The compact eccentric crusher of claim 13 wherein the crushing roller is mounted to the eccentric shaft by a plurality of bearings such that the crushing roller is rotatable about the eccentric shaft, wherein the magnetic braking force restricts the rotation of crushing roller about the eccentric shaft.

* * * * *